United States Patent
Antweiler

(10) Patent No.: US 12,162,756 B2
(45) Date of Patent: Dec. 10, 2024

(54) PROCESS FOR HYDROCARBON PYROLYSIS WITH A SPATIALLY SEPARATE HEATING ZONE AND REACTION ZONE INSIDE THE REACTOR SPACE

(71) Applicants: thyssenkrupp Industrial Solutions AG, Essen (DE); thyssenkrupp AG, Essen (DE)

(72) Inventor: Nicolai Antweiler, Essen (DE)

(73) Assignees: thyssenkrupp Uhde GmbH, Dortmund (DE); thyssenkrupp AG, Essen (DE)

( * ) Notice: Subject to any disclaimer, the term of this patent is extended or adjusted under 35 U.S.C. 154(b) by 737 days.

(21) Appl. No.: 17/415,001

(22) PCT Filed: Dec. 12, 2019

(86) PCT No.: PCT/EP2019/084807
§ 371 (c)(1),
(2) Date: Jun. 17, 2021

(87) PCT Pub. No.: WO2020/126789
PCT Pub. Date: Jun. 25, 2020

(65) Prior Publication Data
US 2022/0063996 A1   Mar. 3, 2022

(30) Foreign Application Priority Data
Dec. 18, 2018   (DE) ............... 10 2018 132 661.0

(51) Int. Cl.
*C01B 3/28* (2006.01)
*B01J 6/00* (2006.01)
*C09C 1/48* (2006.01)

(52) U.S. Cl.
CPC .............. *C01B 3/28* (2013.01); *B01J 6/008* (2013.01); *C09C 1/48* (2013.01);
(Continued)

(58) Field of Classification Search
CPC .............. C01B 3/28; C01B 2203/0272; C01B 2203/085; C01B 2203/1241;
(Continued)

(56) References Cited

U.S. PATENT DOCUMENTS

| | | |
|---|---|---|
| 2,319,679 A | 5/1943 | Leonard et al. |
| 2,926,073 A | 2/1960 | Robinson |

(Continued)

FOREIGN PATENT DOCUMENTS

| | | |
|---|---|---|
| CA | 2841057 A1 | 1/2013 |
| CN | 101248007 A | 8/2008 |

(Continued)

OTHER PUBLICATIONS

English Translation of International Search Report issued in PCT/EP2019/084807, dated Mar. 30, 2020.

(Continued)

*Primary Examiner* — Daniel C. Mccracken
(74) *Attorney, Agent, or Firm* — thyssenkrupp North America, LLC

(57) ABSTRACT

A process can be utilized to produce hydrogen and pyrolysis carbon from hydrocarbons where the hydrocarbons are converted into hydrogen and carbon in a reactor at temperatures of 1000° C. or more and the reactor has at least two electrodes that are at a distance from one another in a flow direction of the hydrocarbons. To avoid carbon deposits in a region between the electrodes, which can lead to failure of a heating system, the carbon particles may be introduced into the reactor in countercurrent to the hydrocarbons and may be heated in a heating zone between the electrodes to a temperature above a decomposition temperature of the hydrocarbons at such a mass flow that a reaction zone in which the hydrocarbons are converted into hydrogen and (Continued)

carbon is spatially separated in a flow direction of the carbon particles from the heating zone.

20 Claims, 2 Drawing Sheets

(52) U.S. Cl.
CPC .................... *C01B 2203/0272* (2013.01); *C01B 2203/085* (2013.01); *C01B 2203/1241* (2013.01)

(58) Field of Classification Search
CPC ....... C01B 2203/142; B01J 6/008; B01J 8/12; B01J 2208/00415; B01J 2219/0004; B01J 8/42; C09C 1/48
See application file for complete search history.

(56) References Cited

U.S. PATENT DOCUMENTS

| | | | |
|---|---|---|---|
| 2,982,622 A * | 5/1961 | Silveston | C10B 55/10 208/126 |
| 3,163,496 A * | 12/1964 | Jahnig | C10B 19/00 201/14 |
| 3,254,957 A | 6/1966 | Meiers | |
| 3,284,161 A | 11/1966 | Pohlenz | |
| 5,650,132 A | 7/1997 | Murata et al. | |
| 5,997,837 A | 12/1999 | Lynum | |
| 6,315,977 B1 * | 11/2001 | Cantacuzene | C01B 3/26 422/651 |
| 6,670,058 B2 | 12/2003 | Muradov | |
| 8,002,854 B2 | 8/2011 | Muradov et al. | |
| 8,318,997 B2 | 11/2012 | Mcalister | |
| 8,618,181 B2 | 12/2013 | Waguespack et al. | |
| 9,834,440 B2 | 12/2017 | Kern et al. | |
| 10,233,078 B2 | 3/2019 | Schneider et al. | |
| 11,078,077 B2 | 8/2021 | Hans-Jurgen et al. | |
| 2014/0127121 A1 | 5/2014 | Maass et al. | |
| 2015/0144476 A1 | 5/2015 | Anigurkin et al. | |
| 2018/0065850 A1 | 3/2018 | Cornejo et al. | |

FOREIGN PATENT DOCUMENTS

| | | | |
|---|---|---|---|
| CN | 102906227 A | 1/2013 | |
| CN | 103687802 A | 3/2014 | |
| CN | 104937076 A | 9/2015 | |
| CN | 108779404 A | 11/2018 | |
| DE | 118263 * | 2/1976 | ............ C01B 31/02 |
| DE | 000000118263 A1 | 2/1976 | |
| DE | 10 2013 112 205 A1 | 5/2014 | |
| WO | 9320153 A | 10/1993 | |
| WO | 2010/104421 A1 | 9/2010 | |
| WO | 2013 004398 A2 | 1/2013 | |
| WO | 2014/095661 A1 | 6/2014 | |
| WO | 2014/097142 A1 | 6/2014 | |
| WO | 2016/154666 A1 | 10/2016 | |

OTHER PUBLICATIONS

Muradov, "Thermocatalytic CO2-Free Production Of Hydrogen From Hydrocarbon Fuels", U.S. Department of Energy, 105 pages, 2003.

Rodat, et al., "A pilot-scale solar reactor for the production of hydrogen and carbon black from methane splitting", International Journal of Hydrogen Energy, 35:7748-7758, Apr. 2010.

Dunker, et al.,"Kinetic modeling of hydrogen production by thermal decomposition of methane", Int. J. Hydrogen Energy, 31:1989-1998 (2006).

Dunker, et al., "Production of hydrogen by thermal decomposition of methane in a fluidized-bed reactor—Effects of catalyst, temperature, and residence time", Int. J. Hydrogen Energy, 31:473-484 (2006).

Maag, et al., "Solar thermal cracking of methane in a particle-flow reactor for the co-production of hydrogen and carbon", International Journal of Hydrogen Energy, 34: 7676-7685, 2009.

Steinberg et al., Rates of Reaction and Process Design Data for the Hydrocarb Process, EPA, 4 pages, Apr. 1993.

Bai, et al., "Catalytic decomposition of methane over activated carbon", J. Anal. Appl. Pyrolysis, 73:335-341 (2005).

Moliner, et al., "Thermocatalytic decomposition of methane over activated carbons: influence of textural properties and surface chemistry", International Journal of Hydrogen Energy, 30:293-300 (2005).

Kreysa, "Climate Protection by an Alternative Use of Methane—The Carbon Moratorium", Chem. Sus. Chem., 2:49-55, 2009.

Lynum, S. et al., "Hydrogen from Natural Gas Without Release of CO2 to the Atmosphere", The Kvaener CB&H Process, Bjorn Gaudernack, Institute of Technology, 5th Annual Hydrogen Meeting, National Hydoregen Association (1994).

Hox, et al., "Plasmabased Hydrogen and Energy Production", Hydrogen Power: Theoretical and Engineering Solutions, pp. 143-148 (1998).

Muradov, et al., Autothermal catalytic pyrolysis of methane as a new route to hydrogen production with reduced CO2 emissions, Catalysis Today, 116:281-288 (2006).

Kreysa, et al., "Decarbonisation of Fossil Energy via Methane Pyrolysis", The Future Role of Hydrogen in Petrochemistry and Energy Supply, DGMK Conference Oct. 4-6, 2010, Berlin, Germany, pp. 31-38 (2010).

Sandstede, G., "Decompostion of Hydrocarbons into Hydrogen and Carbon for the CO2-free Production of Hydrogen", Battelle Institut, Germany, pp. 1745-1753 (1992).

\* cited by examiner

PROCESS FOR HYDROCARBON PYROLYSIS WITH A SPATIALLY SEPARATE HEATING ZONE AND REACTION ZONE INSIDE THE REACTOR SPACE

CROSS REFERENCE TO RELATED APPLICATIONS

This application is a U.S. National Stage Entry of International Patent Application Serial Number PCT/EP2019/084807, filed Dec. 12, 2019, which claims priority to German Patent Application No. DE 10 2018 132 661.0, filed Dec. 18, 2018, the entire contents of both of which are incorporated herein by reference.

FIELD

The present disclosure generally relates to pyrolytic decomposition of hydrocarbons into hydrogen and pyrolysis carbon.

PRIOR ART

In the near to medium-term future, hydrogen production will continue to be based on fossil fuels, first and foremost natural gas (NG). On the other hand, conventional hydrogen production processes are one of the main sources of anthropogenic $CO_2$ emissions into the atmosphere.

In principle, hydrogen can be obtained from hydrocarbon fuels by oxidative and nonoxidative conversion processes. Oxidative conversions comprise the reaction of hydrocarbons with oxidants such as water, oxygen or combinations of water and oxygen (steam reforming, partial oxidation and autothermal reformation processes). In these processes, a mixture of hydrogen and carbon monoxide (synthesis gas) is formed as a first step, and the hydrogen is separated off from this mixture by gas conditioning (water gas shift reaction) and preferably oxidation reactions and also $CO_2$ removal stages. The total $CO_2$ emissions from these processes attains up to 0.4 $m^3$ per $m^3$ of hydrogen produced.

Nonoxidative processes include the thermal decomposition (or dissociation, pyrolysis, cracking) of hydrocarbons into hydrogen and carbon. The thermal decomposition of natural gas has been used for a number of decades as a method for producing carbon black, with hydrogen representing a product of value which is additionally obtained in the process. In these processes, hydrocarbon vapor is decomposed at a temperature of about 1400° C. over a preheated contact into hydrogen and carbon black particles. The process has been, for example, carried out as semicontinuous (cyclic) process using two tandem reactors. U.S. Pat. No. 2,926,073 describes an improved apparatus for producing carbon black and hydrogen from hydrocarbons by means of a continuous thermal decomposition process.

To provide the reaction enthalpy required for the reaction, electric heat input is particularly suitable, with power generated from renewable resources being able to be advantageously utilized for the process. The process is in this case a "green" hydrogen technology. The reactor here is resistance-heated by means of at least one electrode pair arranged axially in the particle bed. Although carbon particles intrinsically have a high electrical conductivity, the electrical resistance results from the contact points between the particles and the small transfer areas. The electric current flows through the carbon bed and dissipates into thermal energy because of the electrical resistance of the particle bed.

U.S. Pat. No. 2,982,622 describes a process for the thermal decomposition of methane gas into hydrogen and carbon, wherein methane gas fed into a reactor is introduced into a bed of coke particles. In the middle region of the reactor, there are a plurality of electrodes via which the coke particles are resistance-heated, so that a reaction zone having a temperature in the region of about 1040-1380° C. is formed in the region between the electrodes, and the pyrolysis reaction of the methane fed in to form carbon and hydrogen takes place in this reaction zone. During the course of the process, further carbon particles are continuously introduced from above into the reactor space while carbon particles are taken off on the underside. In addition, it is possible to return the carbon particles taken off on the underside to the process on the upper side of the reactor. This way of carrying out the process is said to ensure effective heat transfer from the gas coming from the reaction zone to the carbon particles and also from the carbon particles coming out from the reaction zone to the gas being fed in.

The use of carbon particles instead of other catalyst materials, some of which allow a reaction of hydrocarbons even at temperatures below 1000° C. (cf., for example, U.S. Pat. No. 3,284,161), is associated with the advantage that it is possible to formulate the carbon as early as in the reaction step. When carbon particles are provided at the beginning, the methane preferentially pyrolyzes on the initially charged particles, but formation of carbon black can also occur in the gas phase. The particle sizes can be adjusted via the size of the initially charged particles and the specific carbon deposition.

However, a problem associated with the procedure described in U.S. Pat. No. 2,982,622 is that homogenous heat input over a prolonged time cannot easily be ensured. To obtain a homogeneous heat input into the heating volume, a homogeneous electrical resistance over the entire cross-sectional area of the reactor is necessary. If paths having a different electrical resistance occur, the electric current preferentially flows into the regions of the lower electrical resistance, which results in the conversions being higher in these regions, owing to higher temperatures. During the course of operation of the pyrolysis reactor, deposition of pyrolytic carbon occurs over time, which results in the resistance along these "preferential paths" being reduced further. This results in hot spots and ultimately in failure of the heating concept.

A further critical aspect of a procedure as described in U.S. Pat. No. 2,962,622 is the increased blocking tendency as a consequence of the formation of pyrolysis carbon bridges.

To solve these problems, U.S. Pat. No. 3,254,957 proposes a procedure in which a reactor filled to a particular height with coke particles is used. In the region below the upper particle fill level, a plurality of electrodes via which the particle material is resistance-heated are installed in the reactor. The coke particles in the reactor are fluidized by an inert gas (e.g. hydrogen) introduced from below into the coke particles. Methane gas is introduced into the coke particle bed in the region above the electrodes and converted there, so that hydrogen generated in the reaction process can be taken off on the upper side of the reactor.

Although a procedure as is described in U.S. Pat. No. 3,254,957 avoids the abovementioned disadvantages of the process of U.S. Pat. No. 2,982,622, a significant disadvantage of this process concept is that heat exchange between the coke particles and the hydrocarbon material to be decomposed is not possible. The teaching of U.S. Pat. No. 3,254,957 thus requires a significantly greater energy input than the process described in U.S. Pat. No. 2,982,622, which has an adverse effect on the economics of the process.

Thus, a need exists for a process for the pyrolytic decomposition of hydrocarbons and in particular methane gas into hydrogen and carbon, which realizes, firstly, the advantageous energy transfer between hydrocarbons and carbon particles as in the process described in U.S. Pat. No. 2,982,622 but in which the problems of bridge formation and blocking in the region between the electrodes are avoided.

DETAILED DESCRIPTION

Figure 1:
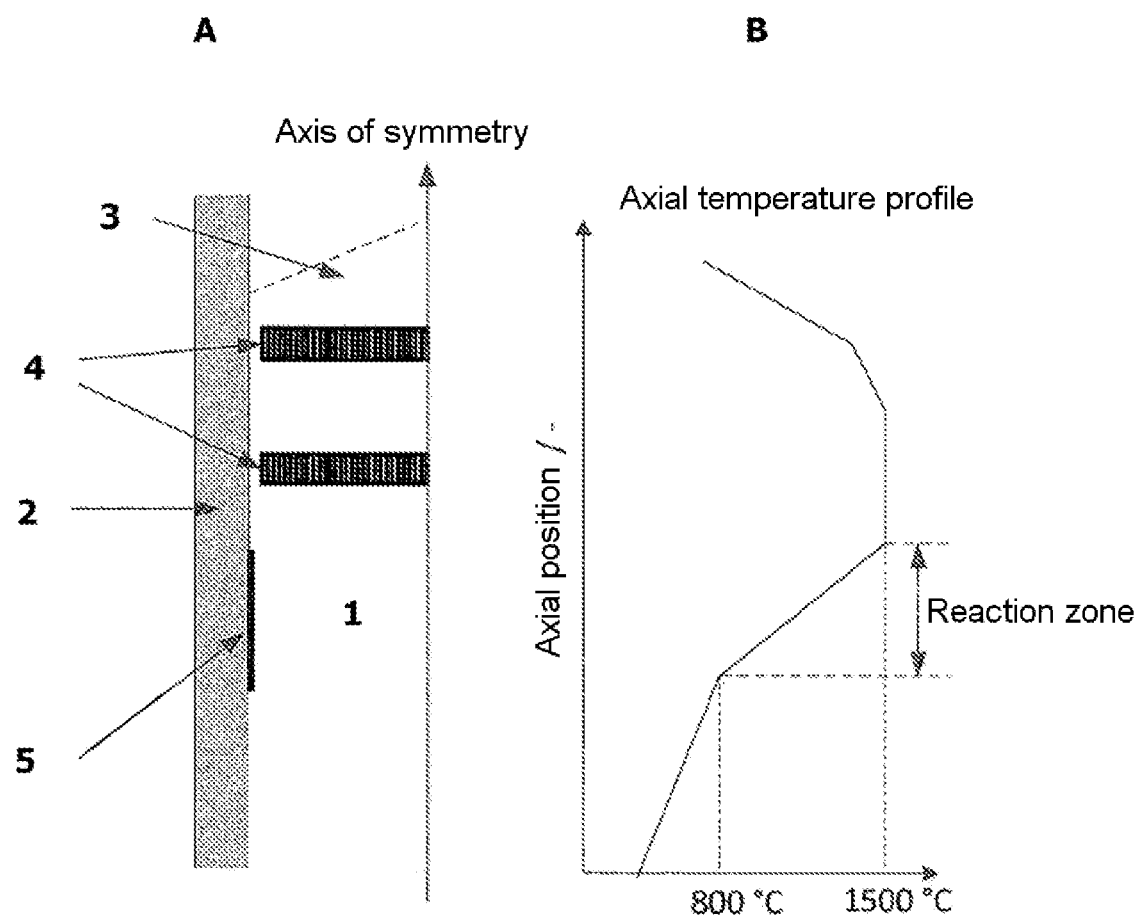
FIG. 1A is a graph depicting an example reactor having a reactor space bounded by a reactor wall.
FIG. 1B is a graph depicting an example temperature profile for a reactor of the present disclosure.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure is in the field of the pyrolytic decomposition of hydrocarbons and preferably of methane into hydrogen and pyrolysis carbon. The present disclosure generally relates to novel processes for a corresponding reaction, in which the reaction zone in which the hydrocarbons are converted into hydrogen and carbon is located underneath electrodes via which carbon particles are resistance-heated in a reactor so that an inhomogeneous heat input and the formation of solid agglomerates, which could lead to blocking of the reactor, in the reactor space between the electrodes is avoided. The present disclosure further relates to processes of this type in which a plurality of reactors are connected in series and in which carbon particles from a preceding reactor are fed into a downstream reactor, and also corresponding apparatuses.

In some examples, hydrocarbons are converted into hydrogen and carbon in a reactor at temperatures of 1000° C. or more and the reactor has at least two electrodes which are at a distance from one another in the flow direction of the hydrocarbons, in which carbon particles or packings thereof are introduced into the reactor in countercurrent to the hydrocarbons and are heated in the region between the electrodes to a temperature above the decomposition temperature of the hydrocarbons to form hydrogen and carbon at such a speed that the reaction zone in which the hydrocarbons are converted into hydrogen and carbon is spatially separated in the flow direction of the carbon particles from the heating zone located between the electrodes.

Accordingly, in the context of the present invention the reaction front in which the important decomposition reaction of the hydrocarbons to form hydrogen and carbon takes place is shifted into the region below the heating elements or below the electrodes. Such positioning of the reaction front can be realized by suitable setting of the temperature to which the carbon particles are heated in the region between the electrodes and also the mass flow of the carbon particles through the reactor and the mass flow of the hydrocarbons which are conveyed through the reactor in countercurrent to the carbon particles.

The heat integration of the electrically heated carbon bed in the reaction zone brings about a countercurrent mode of operation via moving bed operation of the carbon, with the zone of high temperature and thus the reaction zone being able to be positioned underneath the bottom electrode via the speed or via the heat capacity flow of the carbon bed. The particles coated with pyrolysis carbon can, after passing through the reactor, be discharged at the bottom of the reactor.

As a result of the pyrolysis reaction taking place below the electrodes, pyrolysis in the region between the electrodes is essentially completely prevented, so that the electrical resistance of the particles present between the electrodes is not influenced by the generation of carbon in this region. Homogeneous heat input over the cross section can thus be ensured even over long periods of operation of the reactor and failure of the heating and the formation of hot spots can be ruled out.

In the context of the present invention, "below" means closer positioning of the indicated object to the center of the earth compared to a reference object.

Kinetically, the pyrolysis of hydrocarbons is relevant at temperatures of more than 800° C., so that the reaction enthalpy available is given by the product of heat capacity and temperature difference (the temperature difference here refers to the difference between the temperature of the particles which have been heated up between the electrodes and the temperature of 800° C. required for a relevant reaction). It should therefore be ensured that in the process of the invention the carbon particles are heated to a temperature above 800° C. in the region of the electrodes. To make it possible for the reaction zone to be shifted to below the electrodes, it is advantageous for the carbon particles to be heated to a temperature in the range from 1000° C. to 2000° C., preferably from 1200° C. to 1800° C. and more preferably from 1400° C. to 1600° C., between the electrodes. An upper limit of 1600° C. has the advantage that the reactor can be lined with conventional materials, which has a favorable effect on the costs of the corresponding reactor.

The hydrocarbons to be introduced into the process of the invention are not subject to any relevant restrictions, as long as the liberation of hydrogen and the formation of carbon are possible in the temperature range above 1000° C. As suitable hydrocarbons, mention may be made by way of example of hydrocarbons which are gaseous or liquid at normal temperatures and atmospheric pressure, for example methane, propane, gasoline, diesel, waste oil or crude oil. For the purposes of the present invention, gaseous hydrocarbons such as methane and propane are preferred hydrocarbons, and among these methane is most preferred. The reaction of these hydrocarbons occurs according to the reaction equations:

$$CH_4 \rightarrow C + 2H_2, \text{ or}$$

$$C_nH_m \rightarrow nC + m/2 H_2,$$

where n is greater than 1 and m is equal to or less than (2n+2). Both reactions are endothermic.

The process of the invention can be carried out particularly advantageously when using methane as starting material since methane is available in large quantities as a constituent of natural gas and is also cheap. The hydrocarbons in the process of the present invention are therefore preferably methane or natural gas.

In a preferred embodiment, the hydrocarbons or methane are preferably introduced at a speed of from 0.1 m/s to 10 m/s, preferably from 0.2 m/s to 5 m/s, into the reactor.

The carbon particles are preferably pyrolysis carbon particles or coke particles, very particularly preferably pyrolysis carbon particles. As an alternative or in addition, the carbon particles advantageously have a particle size in the range from 0.5 mm to 16 mm and preferably from 1 mm to 8 mm.

As carbon particles, use is made of ones which promote pyrolytic decomposition of the hydrocarbons in the range above 1000° C. and are electrically conductive. Accordingly, electrically conductive particles or packings having a conductivity of from 0.001 to 100 S/m can be used particularly advantageously. Commercial products which satisfy this requirement are, for example, DARCO® KB-B (from Norit Americas Inc.), Black Pearls2000 (from CABOT Corp.) or XC-72 (from CABOT Corp.), or else calcined petroleum coke having a low sulfur content (<1% by weight) or the pyrolysis carbon generated in the course of the methane pyrolysis.

In a further advantageous embodiment of the process, the carbon particles are conveyed through the reactor at a speed of from 0.1 m/h to 100 m/h, preferably from 0.1 m/h to 20 m/h and particularly preferably from 1 m/h to 10 m/h (the speed here designates the speed at which the particles travel through the reactor).

Furthermore, it is advantageous for the reactor to be operated at a pressure in the range from 1 bar to 40 bar, preferably from 5 bar to 30 bar.

It was indicated above that the reactor in the process indicated should have at least two electrodes. In a preferred embodiment, the reactor has precisely two electrodes. In an alternative embodiment, the reactor has from 3 to 10 and preferably from four to eight electrodes.

For the carbon particles used in the process described to be able to be utilized as additional product of value, a particular particle size is frequently necessary.

The size of the particles or the specific carbon deposition can be set within certain limits in a reaction step via the temperature level or the heat capacity of the bed of solids. When larger particle sizes are to be produced from comparably small particles, a single pass of the particles through the reaction zone may be insufficient, however, to realize the desired particle size. In order nevertheless to be able to produce larger particle sizes from small particles, it is, however, possible in the context of the invention to return the particles taken off from the lower region of the reactor back to the upper region of the reactor, so that the particles pass through the reaction region a number of times and can thus build up a larger particle size.

A disadvantage of such a procedure can be that there are carbon particles of different sizes in the reactor, which can, owing to a possibly different conductivity behavior of the mixture, make renewed adaptation of the flow speeds of the carbon particles and the hydrocarbons fed in necessary. This disadvantage can be avoided by means of reactors which are connected in series so that the carbon particles taken off at the lower end of a first reactor are introduced into the upper region of a directly following reactor. In a preferred embodiment, the process of the invention is thus modified so that it is carried out in at least two reactors connected sequentially one after the other, with in each case carbon particles in the region below the reaction zone (also referred to as bottom region) in which hydrocarbons are converted into hydrogen and carbon being taken from a preceding reactor and introduced into a directly following reactor in the region above the two electrodes (also referred to as top). A procedure having at least two reactors connected sequentially one after the other also makes it possible to generate significantly larger particles compared to the carbon particle starting material.

In the process described, it is possible to fractionate the carbon particles obtained from the reactor or reactors connected in series (i.e. separate the particles into particles having a predetermined particle size and particles which are smaller than a predetermined particle size). The particles which are smaller than the predetermined particle size can then be recirculated to the reactor, or in the case of a plurality of reactors connected in series, to the first reactor. This procedure makes it possible to decrease the amount of carbon particle material which has to be fed to the process, or even reduce it to zero. The particles which have the predetermined particle size can be taken off as product. In addition, it is possible to feed the particles which are smaller than a predetermined particle size, or part of the product particles, to a commination step, e.g. a roll mill, in which the particles are crushed and comminuted. This can ensure that a sufficiently large number of small particles are present in the process.

A further aspect of the present invention relates to an apparatus for the pyrolytic conversion of hydrocarbons into hydrogen and carbon, which comprises at least two reactors connected in series each having a reactor space, wherein each of these reactor spaces has at least two electrodes which are at a distance from one another in the flow direction of the hydrocarbons and by means of which the reactor can be resistance-heated, and wherein each preceding reactor has an offtake device for particulate material which is located in its lower region and is connected to the upper region of the in each case subsequent reactor and allows the introduction of particulate material into the upper region of the respective subsequent reactor.

In the above-described apparatus, the offtake device is preferably configured as star feeder, transport screw or solids valve. Furthermore, it is advantageous for the at least two reactors connected in series in the apparatus of the invention each to have feed conduits for hydrocarbons and discharge conduits for hydrogen gas. The discharge conduits for hydrogen gas can then be combined at a suitable place into a joint conduit.

The number of reactors can be chosen as a function of the required carbon deposition or the particle access. In each reaction step, hydrocarbon gas, in particular natural gas, is advantageously fed into the lower region of the reactor and converted in the reaction zone into carbon and hydrogen. The hydrogen or the product gas is taken off at the upper end of each reactor, the individual product gas streams are preferably combined and the product gas heat still present therein is advantageously utilized in a steam generator.

As a result of the heat integration of the hot carbon particles into the feed stream of hydrocarbons, the carbon at the bottom of the reactor has a moderate temperature level. In the context of the present invention, it is likewise possible for the hot product gas stream to be used for preheating the feed stream of hydrocarbons. However, this variant suffers from the disadvantages of the high carbon particle temperature and the demanding requirements which the materials of the apparatus for conveying the carbon particles into the next reactor have to meet.

FIG. 1 A shows an illustrative reactor having a reactor space 1 which is bounded by a reactor wall 2. In the reactor space, there are a carbon bed 3, two electrodes 4 and a region 5 in which the reaction of the pyrolysis takes place. An illustrative temperature profile according to the invention for such a reactor structure is indicated in B.

Figure 2:
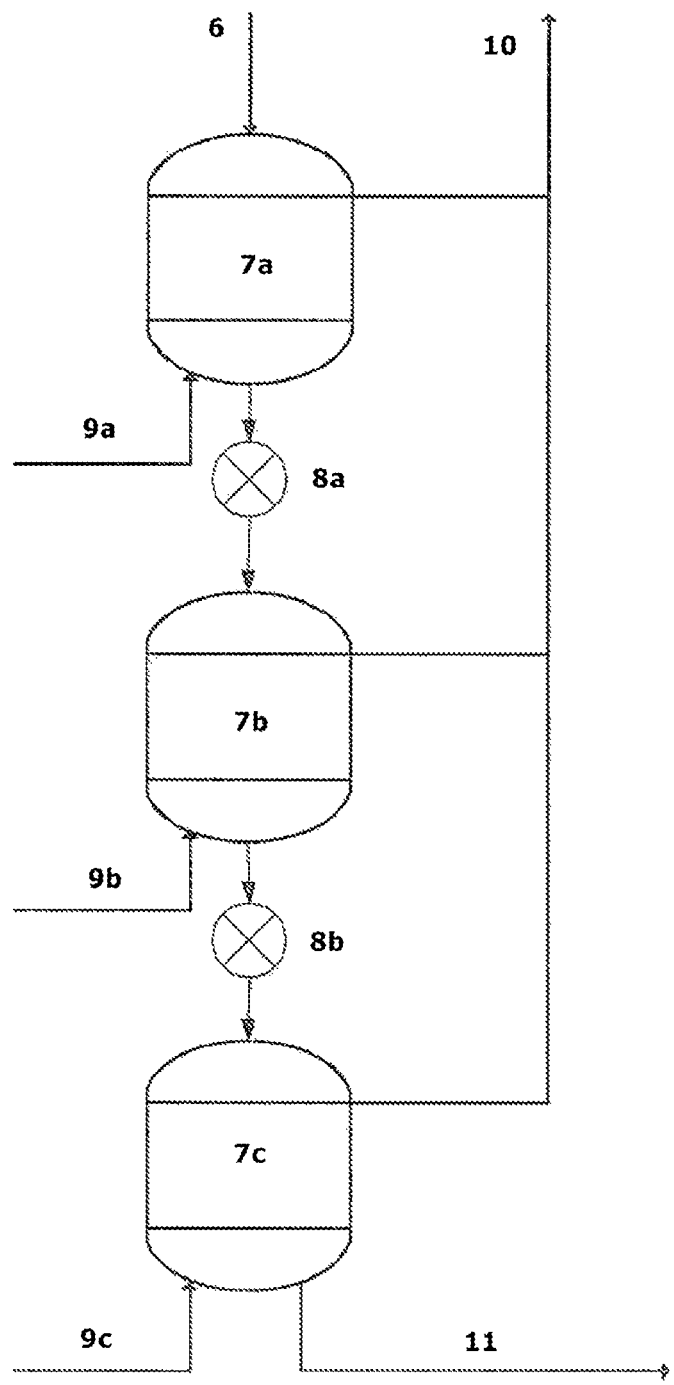
FIG. 2 is a schematic of an example configuration that includes three reactors.

FIG. 2 shows an illustrative configuration with three reactors. In this reaction scheme, carbon particles 6 are introduced at the top of the first reactor 7a and there pass through a first pyrolysis step. The pyrolysis carbon is then gravimetrically transferred via a transport unit 8a, e.g. a star feeder, into a second reactor. The first reactor is supplied via the conduit 9a with hydrocarbon starting material, while the product gas generated in the reactor is discharged via the conduit 10. In the second reactor 7b, which is supplied via the conduit 9b with hydrocarbon starting material, the carbon particles pass through a second pyrolysis step. In the reaction configuration, it has to be ensured that the product gas of the second reactor 7b does not contaminate the feed stream of the hydrocarbon starting material into the first reactor 9a, since this leads to dilution and thus to a reduction in the conversion in the first reactor. The star feeder thus firstly regulates the moving bed speed in the reactor and thus the position of the reaction zone, and secondly isolates the gas phases of the reaction steps from one another. At the lower end of the second reactor 7b, there is another transport unit 8b, e.g. a star feeder, via which the carbon particles are transferred into the third reactor 7c. This is once again supplied with hydrocarbon starting material via the conduit 9c. After passing through the third reactor 7c, the carbon particles are discharged via the conduit 11.

LIST OF REFERENCE NUMERALS

1 Reactor space
2 Reactor wall
3 Carbon particle bed
4 Electrodes
5 Main reaction region
6 Feed conduit for carbon particles
7a, 7b, 7c Reactor
8a, 8b Transport unit
9a, 9b, 9c Feed conduit for hydrocarbon starting material
10 Discharge conduit for product gas
11 Discharge conduit for carbon particles

What is claimed is:

1. A process for producing hydrogen and pyrolysis carbon from hydrocarbons, the process comprising:
   converting hydrocarbons into hydrogen and carbon in a reactor at a temperature of 1000° C. or more, wherein the reactor includes at least two electrodes that are spaced apart from one another in a flow direction of the hydrocarbons, wherein the converting comprises introducing carbon particles or packings thereof into the reactor in countercurrent to the hydrocarbons and heating the carbon particles or packings thereof in a heating zone between the at least two electrodes to a temperature above a decomposition temperature of the hydrocarbons at such a speed that a reaction zone in which the hydrocarbons are converted is spaced apart in a flow direction of the carbon particles or packings thereof from the heating zone; and
   conveying the carbon particles or packings thereof through the reactor at a speed of from 0.1 to 20 m/h.

2. The process of claim 1 comprising heating the carbon particles or packings thereof to 1200°° C. to 1800° C. between the at least two electrodes.

3. The process of claim 1 wherein the carbon particles or packings thereof have a conductivity of from 0.001 S/m to 100 S/m.

4. The process of claim 1 wherein the hydrocarbons are methane or natural gas.

5. The process of claim 1 comprising conveying the hydrocarbons through the reactor at a speed of from 0.1 to 10 m/s.

6. The process of claim 1 comprising operating the reactor at a pressure in a range from 1 to 40 bar.

7. The process of claim 1 wherein the reactor is a first reactor, wherein the process is performed in the first reactor and in a second reactor, which are connected sequentially, with the first reactor being upstream of the second reactor and with the second reactor including at least two electrodes that are spaced apart from one another in a flow direction of the hydrocarbons, the process comprising taking off the carbon particles or packings thereof from a region below the reaction zone in the first reactor and introducing the carbon particles or packings thereof into a region above the at least two electrodes in the second reactor.

8. The process of claim 1 comprising:
   fractionating carbon particles that are taken from the reactor, wherein at least a subset of the carbon particles taken are smaller than a predetermined particle size; and
   recirculating the subset of carbon particles to the reactor.

9. A process for producing hydrogen and pyrolysis carbon from hydrocarbons, the process comprising:
   converting hydrocarbons into hydrogen and carbon in a reactor at a temperature of 1000° C. or more, wherein the reactor includes at least two electrodes that are spaced apart from one another in a flow direction of the hydrocarbons, wherein the converting comprises introducing carbon particles or packings thereof into the reactor in countercurrent to the hydrocarbons and heating the carbon particles or packings thereof in a heating zone between the at least two electrodes to a temperature above a decomposition temperature of the hydrocarbons at such a speed that a reaction zone in which the hydrocarbons are converted is spaced apart in a flow direction of the carbon particles or packings thereof from the heating zone; and
   conveying the hydrocarbons through the reactor at a speed of from 0.1 to 10 m/s.

10. The process of claim 9 comprising heating the carbon particles or packings thereof to 1200° C. to 1800° C. between the at least two electrodes.

11. The process of claim 9 wherein the carbon particles or packings thereof have a conductivity of from 0.001 S/m to 100 S/m.

12. The process of claim 9 wherein the hydrocarbons are methane or natural gas.

13. The process of claim 9 comprising operating the reactor at a pressure in a range from 1 to 40 bar.

14. The process of claim 9 wherein the reactor is a first reactor, wherein the process is performed in the first reactor and in a second reactor, which are connected sequentially, with the first reactor being upstream of the second reactor and with the second reactor including at least two electrodes that are spaced apart from one another in a flow direction of the hydrocarbons, the process comprising taking off the carbon particles or packings thereof from a region below the reaction zone in the first reactor and introducing the carbon particles or packings thereof into a region above the at least two electrodes in the second reactor.

15. The process of claim 9 comprising:
fractionating carbon particles that are taken from the reactor, wherein at least a subset of the carbon particles taken are smaller than a predetermined particle size; and
recirculating the subset of carbon particles to the reactor.

16. An apparatus for pyrolytic conversion of hydrocarbons into hydrogen and carbon, the apparatus comprising:
at least two reactors connected in series, with each of the at least two reactors including a reactor space, wherein each reactor space includes at least two electrodes that are spaced apart from one another in a flow direction of the hydrocarbons, wherein each reactor is configured to be resistance-heated by the respective at least two electrodes, wherein a first of the at least two reactors includes an off-take device for particulate material that is located in a lower region of the reactor and is connected to an upper region of a downstream reactor of the at least two reactors, wherein the off-take device allows introduction of the particulate material into the upper region of the downstream reactor.

17. The apparatus of claim 16 wherein the off-take device is a star feeder.

18. The apparatus of claim 16 wherein the off-take device is a transport screw.

19. The apparatus of claim 16 wherein the off-take device is a solids valve.

20. The apparatus of claim 16 wherein each of the at least two reactors includes a feed conduit for the hydrocarbons and a discharge conduit for hydrogen gas.

\* \* \* \* \*